(12) United States Patent
Daine

(10) Patent No.: US 7,717,186 B2
(45) Date of Patent: May 18, 2010

(54) REMOVABLE HORSESHOE CLIP

(75) Inventor: Lawrence Ronald Daine, Edwardsville, IL (US)

(73) Assignee: Lee Emery Corporation, Edwardsville, IL (US)

( * ) Notice: Subject to any disclaimer, the term of this patent is extended or adjusted under 35 U.S.C. 154(b) by 0 days.

(21) Appl. No.: 12/418,036

(22) Filed: Apr. 3, 2009

(65) Prior Publication Data

US 2009/0188680 A1 Jul. 30, 2009

Related U.S. Application Data

(63) Continuation-in-part of application No. 11/938,667, filed on Nov. 12, 2007, now abandoned.

(51) Int. Cl.
*A01L 7/00* (2006.01)
*A01L 3/00* (2006.01)

(52) U.S. Cl. .................. 168/19; 168/17; 168/4

(58) Field of Classification Search .......... 168/4, 168/12, 13, 14, 24, 1, 19, 20, 22, 17; *A01L 3/00, A01L 3/02, 3/04, 1/00, 1/02, 1/04, 11/00, A01L 7/00*
See application file for complete search history.

(56) References Cited

U.S. PATENT DOCUMENTS

| 209,575 | A | 11/1878 | McKinney |
|---|---|---|---|
| 340,440 | A | 4/1886 | Hayes |
| 492,460 | A | 2/1893 | Crannell |
| 492,481 | A | 2/1893 | Crannell |
| 726,643 | A | 4/1903 | Colleran |
| 856,848 | A | 6/1907 | De Launey |
| 884,504 | A | 4/1908 | Lang |
| 1,048,180 | A | 12/1912 | Kratzig |
| 1,153,101 | A | 2/1915 | Muhlbach |
| 1,273,294 | A | 7/1918 | Warminski |
| 1,496,511 | A | 6/1924 | Allman |
| 1,825,186 | A | 9/1931 | Harsem |
| 3,302,723 | A | 2/1967 | Renkenberger et al. |
| 3,519,079 | A | 7/1970 | Bieber |

FOREIGN PATENT DOCUMENTS

| DE | 3424726 A1 | 2/1986 |
|---|---|---|
| EP | 233335 A2 * | 8/1987 |
| EP | 422393 A2 * | 4/1991 |
| WO | 9742813 A1 | 5/1997 |
| WO | 03000049 A1 | 1/2003 |

OTHER PUBLICATIONS

Product advertisement for Shoe-TRU as shown in printout of website address: http://www.shoetru.com/ dated Dec. 7, 2007, consisting of 3 pages.

* cited by examiner

*Primary Examiner*—Son T. Nguyen
(74) *Attorney, Agent, or Firm*—Polster, Lieder, Woodruff & Lucchesi, L.C.

(57) ABSTRACT

A removable horseshoe clip for temporarily placement on a horseshoe during the fitment process to secure the horseshoe against slipping or rotational movement during nailing, and method of use. The removable horseshoe clip includes an inner retaining clip sized to engage the inner peripheral edge of a horseshoe, a broad base for seating against the bottom surface of the horseshoe, and an outer retaining clip adapted to abut the outer peripheral edge of a horseshoe and the outer surface of a hoof wall.

15 Claims, 4 Drawing Sheets

REMOVABLE HORSESHOE CLIP

CROSS-REFERENCE TO RELATED APPLICATIONS

The present application is a continuation-in-part of, and claims priority from, U.S. patent application Ser. No. 11/938,667, filed on Nov. 12, 2007, and which is herein incorporated by reference.

STATEMENT REGARDING FEDERALLY SPONSORED RESEARCH

Not Applicable.

BACKGROUND OF THE INVENTION

The present application is related generally to the attachment of horseshoes to an equine hoof, and in particular, to a clip which may be temporarily secured to a horseshoe during the shoeing procedure to facilitate proper placement and alignment of the horseshoe relative to the equine hoof, and which may be subsequently removed from the horseshoe after attachment of the horseshoe to the equine hoof.

Horseshoes have traditionally been utilized to provide traction and protection to the hooves of equines. A standard horse shoe, such as shown in FIG. 1A is formed from metal, typically a soft steel or aluminum, but may be of other materials as well. The front or leading edge of the horseshoe is known as the toe, while the trailing arms or portions are known as the heels. When attached to a hoof, the heel portion closest to horse's body centerline is referred to as the inside (medial) heel, while the opposite heel portion is referred to as the outside (lateral) heel.

Equine hoof structure and shape may vary from animal to animal, as well as from hoof to hoof on a single horse, and hence, it is common practice for a farrier to adjust the shape of each individual horseshoe to fit the particular hoof prior to nailing. Adjustment may be done by cold forming, i.e., hammering alone, or in combination with heating. Once a horseshoe is sized and fitted to a hoof, nails, such as shown in FIG. 2, are driven through the nail holes in the horseshoe and into the tough outer hoof wall of the equine hoof. Generally, the nails are of sufficient length such that the tip of the nail will protrude through the outer surface of the hoof wall above the horseshoe, allowing the tip to be cut off and bent over to form a clinch which retains the nail in the hoof wall. The sequence in which the nails are driven through the horseshoe and into the hoof wall during attachment is important to ensure the proper placement of the horseshoe relative to the equine hoof structures. The shape of the nail is configured to ensure that the nails will penetrate the hoof wall at an outward incline, ensuring that they are not directed inward towards the sensitive internal structures of the equine hoof.

On a plain horseshoe, such as shown in FIG. 1A, the initial nails are driven into the hoof wall through the nail holes which are closest to the heel on each side to prevent the horseshoe from sliding backwards relative to the hoof during the driving of the nails. However, when one nail is driven in on one side of the horseshoe, the nail may act as a pivot, and the horseshoe may shift or torque about that location, requiring the farrier to hammer on the side of the horseshoe to return it to the desired position before continuing. Hammering on the side of the horseshoe risks a bruising injury to the equine hoof in the event the hammer misses or slips from the horseshoe upon impact, and potentially weakens the hold of the nails which are already driven into place by twisting them within the hoof wall and widening the passage in which they rest.

Some horseshoes, such as shown in FIG. 1B, are formed with one or more permanent clips raised from the upper peripheral edges of the horseshoe. Upon proper fitment of the horseshoe to an equine hoof, the raised clips align along the outer surface of the hoof wall, and serve to prevent the shoe from sliding backwards relative to the hoof during application and use. However, permanent clips increase the cost of production for the horseshoes, and/or require additional time for the farrier to make the clips and properly align them with the hoof surfaces. Permanent clips pose a potential for injury to the hoof structures in the event the horseshoe slips or loosens during use, allowing the raised clip to rotate inward towards the center of the hoof and posing a risk of penetrating puncture injuries.

Accordingly, it would be advantageous to provide a method and means for attaching a horseshoe to an equine hoof which prevents slipping and rotating of the horseshoe during nailing, which does not increase the cost of producing the horseshoe, the time required for preparation of the horseshoe, or pose a potential for injury to the hoof structures after attachment of the horseshoe to an equine hoof.

BRIEF SUMMARY OF THE INVENTION

Briefly stated, the present disclosure provides a removable horseshoe clip which may be placed temporarily on a horseshoe during the fitment process to secure the horseshoe against slipping or rotational movement during the initial nailing of the shoe onto the hoof. Once the initial nails are driven through the shoe and into the hoof, the horseshoe clip is removed from the shoe, and the remaining nails are driven to complete the fitment procedure for the shoe to the hoof. The removable horseshoe clip is formed from a rigid and resilient material, such as spring steel, and includes an inner retaining clip segment configured to engage the inner peripheral edge of a horseshoe, a broad base for seating adjacent the bottom surface of the horseshoe, and an outer retaining clip segment adapted to abut the outer peripheral edge of a horseshoe and to extend upward and along the angled outer surface of a hoof wall. The broad base has a transverse width which is greater than the longitudinal dimension between the inner and outer retaining clip segments, and is defined by three contiguous portions. A central portion is disposed between the inner and outer retaining clip segments, and has a transverse width which is generally equal to the transverse width of the larger of the clip segments. A pair of lateral bracing segments or wings extend transversely from each side of the central portion, such that the overall transverse width of the base, defined by a left bracing segment, the central portion, and a right bracing segment, exceeds the front-to-back dimension of the central portion, laterally displacing a pivot point outward from the central portion to resist accidental dislodgement from the horseshoe.

The present disclosure further provides a method for facilitating the attachment of horseshoes to an equine hoof utilizing one or more removable horseshoe clips each having an inner retaining clip segment configured to engage the inner peripheral edge of a horseshoe, a broad base for seating adjacent the bottom surface of the horseshoe, and an outer retaining clip segment adapted to abut the outer peripheral edge of a horseshoe and to extend upward and along the angled outer surface of a hoof wall. The method requires the initial step of sizing and fitting of the horseshoe to the equine hoof. Prior to driving nails or other attachment means to secure the horseshoe to the equine hoof, one or more removable horseshoe clips are engaged with the horseshoe by resiliently deflecting the inner and outer retaining clip segments in a slightly outward direction as the clip segments are engaged with the inner and outer peripheral edges of the horseshoe. Lateral bracing segments of the broad base abut against the lower surface of the horseshoe, preventing accidental twisting disengagement of the inner and outer retaining clip segments from the horseshoe. The removable horseshoe clips are positioned to avoid interference with the required placement for the initially driven nails or other attachment means, and to provide for an abutting engagement with the outer hoof surfaces when the horseshoe is disposed against the equine hoof in the desired placement position. The horseshoe is then secured to the equine hoof using nails or other attachment means, while the abutting engagement between the extended outer retaining clip segment and the hoof outer surface prevents sliding and rotating movement of the horseshoe. Once the horseshoe is secured to the equine hoof, the removable horseshoe clips are released from the horseshoe by application of a vertically downward force, effectively "popping" the inner and outer retaining clip segments from engagement with the inner and outer peripheral edges of the horseshoe, and allowing the clips to resiliently spring back to their original orientation relative to the broad base. The horseshoe is subsequently retained in place by the nails or other attachment means.

In an alternate embodiment of the removable horseshoe clip, the inner and/or outer regaining clip segments include tensions relief slots or openings which remove material from the retaining clip segments and which extend partially into the base portion, altering the resilient spring force or tension which maintains the inner and outer retaining clips at their associated rest positions.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1A:
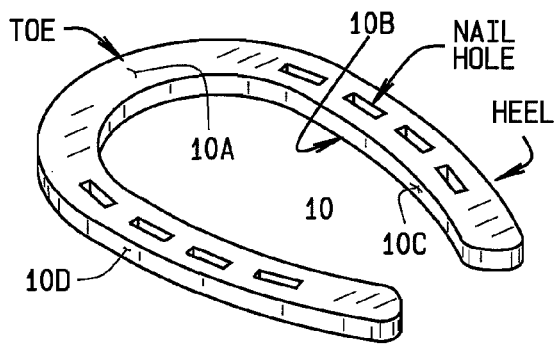
FIG. 1A is a perspective view of a prior art horseshoe without integrally formed clips.
Figure 1B:
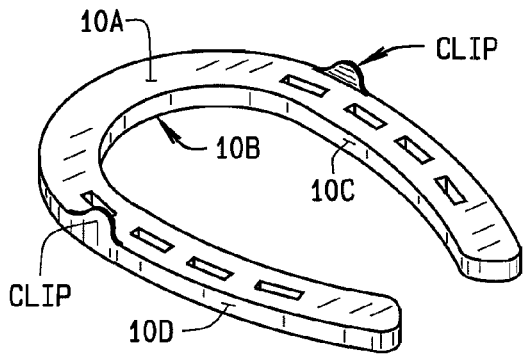
FIG. 1B is a perspective view of a prior art horseshoe with a pair of integrally formed clips.
Figure 2:
FIG. 2 is a prior art side view of a horseshoe nail, enlarged to illustrate the angled surfaces adapted to direct the inclination of the nail through a hoof wall.
Figure 4:
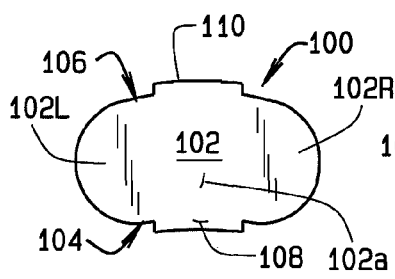
FIG. 4 is a bottom view of the clip of FIG. 3.
Figure 5:
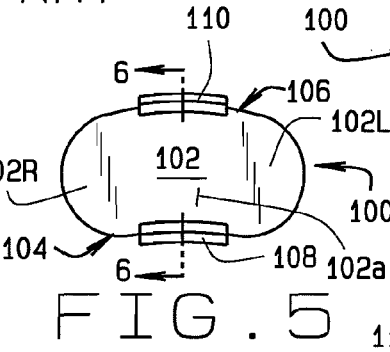
FIG. 5 is a top view of the clip of FIG. 3.
Figure 3:
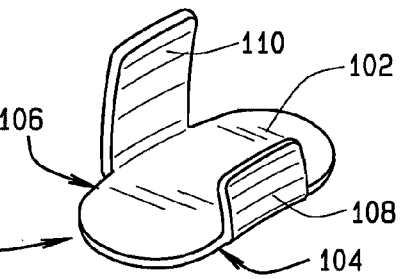
FIG. 3 is a perspective view of a removable horseshoe clip of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures, and in particular to FIGS. 3-6, a removable horseshoe clip of the present disclosure is shown generally at 100. The clip 100 is adapted for temporary placement on a horseshoe 10 having a top surface 10A, a bottom surface 10B, an inner peripheral surface 10C, and an outer peripheral surface 10D during fitment and attachment of the horseshoe to an equine hoof. The horseshoe clip 100 consists of a planar base portion 102 including a central portion 102a having an inner peripheral edge 104 adapted to align with an edge of the inner peripheral surface 10C of the horseshoe 10, and an outer peripheral edge 106 adapted to align with an edge of the outer peripheral surface 10D of the horseshoe 10, and a pair of rigid lateral bracing segments 102R and 102L extended laterally from opposite sides of said central portion. Generally, the front-to-back longitudinal width of the planar base portion 102 is selected to correspond to the width of the horseshoe 10 for which the clip 100 is sized to fit.

Figure 6:
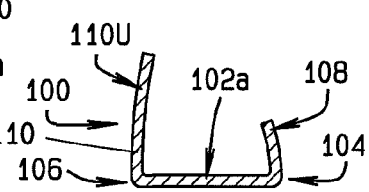
FIG. 6 is a cross-sectional view of the clip of FIG. 5, taken along line 6-6.
Figure 7:
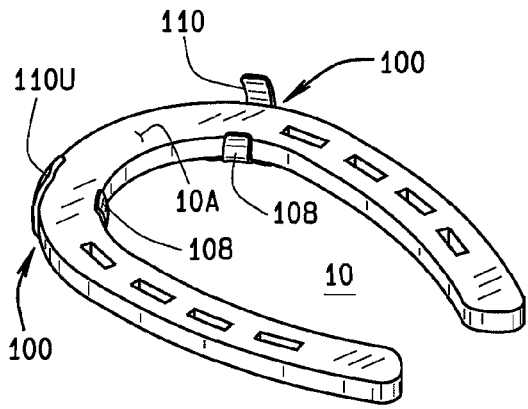
FIG. 7 is a perspective view illustrating the use of a pair of the removable horseshoe clips of FIG. 3 with a horseshoe of FIG. 1A.
Figure 8:
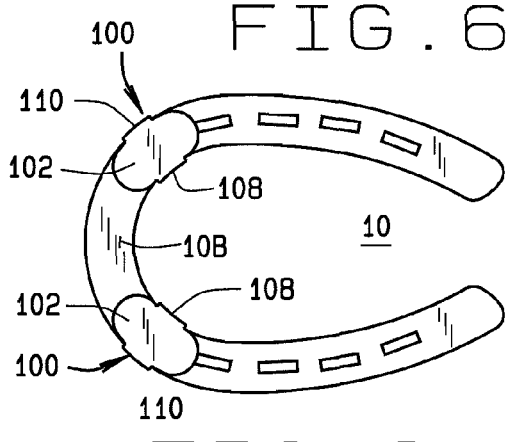
FIG. 8 is a bottom view of the horseshoe and clips shown in FIG. 7.

At least one inner retaining clip 108 is disposed adjacent to the inner peripheral edge 104, and extends generally upward from the central portion 102a. The inner retaining clip 108 has a height which is selected to correspond approximately to, or slightly smaller than, the thickness of the horseshoe 10 for which the clip 100 is sized to fit, and is inclined inward towards the center of the planar base portion 102, as best seen in FIG. 6.

At least one outer retaining clip 110 extends upward from the central portion 102a, adjacent to the outer peripheral edge 106. The outer retaining clip 110 has a height which exceeds the thickness of the horseshoe 10 for which the clip 100 is sized to fit. The height of the outer retaining clip 110 is selected such that a portion of the outer retaining clip 110 will abut an exterior surface of an equine hoof during use, and which is preferably exceeds the thickness of the horseshoe 10 for which the clip 100 is sized to fit. To facilitate abutment with the equine hoof surface, the upper portion 110U of the outer retaining clip 110 is inclined inward towards the center of the planar base portion 102, as best seen in FIG. 6. Preferably, the planar base portion 102, the inner retaining clip 108, and the outer retaining clip 110 are of a unitary construction, such as formed from a resilient stamped metal sheet or spring steel.

During use, a clip 100 is fitted to bottom 10B of the horseshoe 10 in a "snap" or "clamp" style engagement at the desired position. As is best seen in FIG. 6, the inward inclines of the inner retaining clip 108 and the outer retaining clip 110 define a decreasing spacing there between, and is resiliently displaced or deflected outward for engagement with the inner and outer peripheral edges 10C and 10D of a horseshoe 10. The resilient nature of the material forming the inner ant outer retaining clips, together with the outward deflection of at least the inner retaining clip 108 to engage the horseshoe 10 results in a clamping or gripping force exerted between the inner and outer retaining clip segments, which retains the horseshoe clip 100 in engagement with the horseshoe 10 during use. Upon removal of the horseshoe clip 100 from the horseshoe after use, the inner and outer retaining clips resiliently return to their original configuration.

Figure 9:
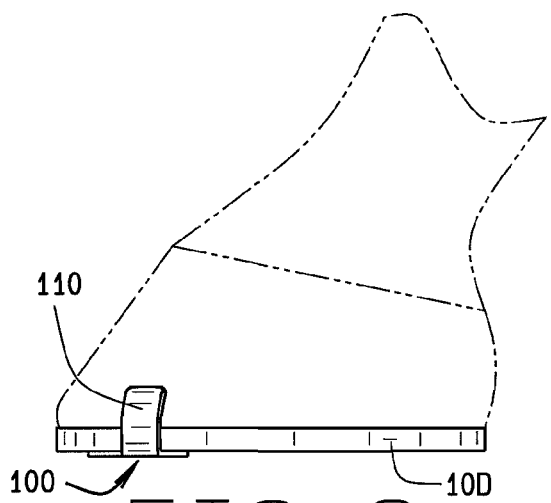
FIG. 9 is a side view of an equine hoof during attachment of the horseshoe shown in FIG. 7.
Figure 10:
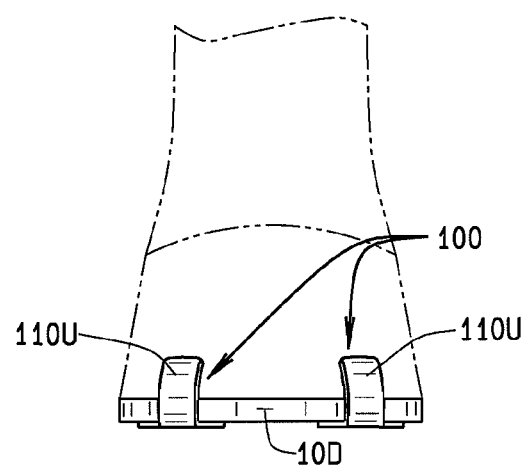
FIG. 10 is a front view of an equine hoof during attachment of the horseshoe shown in FIG. 7.
Figure 11:
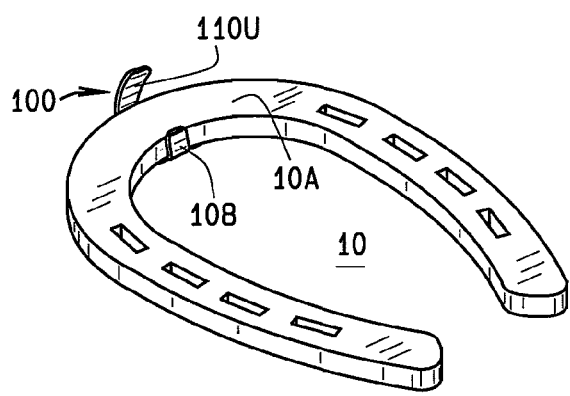
FIG. 11 is a perspective view illustrating the use of a single removable horseshoe clip of FIG. 3 with a horseshoe of FIG. 1A.
Figure 12:
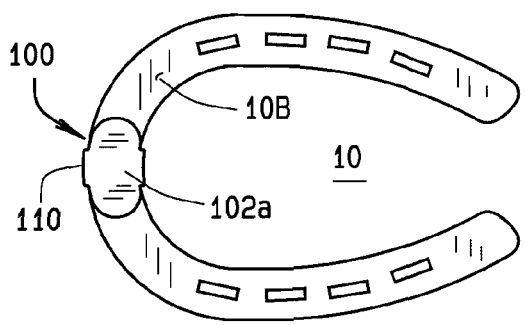
FIG. 12 is a bottom view of the horseshoe and clip shown in FIG. 11.

Preferably, as shown in FIGS. 7-10, two clips 100 are fitted to the bottom surface 10B a horseshoe 10 in a generally mirror-image configuration about a longitudinal midline of the horseshoe 10. The specific placement of the clips 100 may be varied as required to accommodate nail holes within the horseshoe 10, or features of the equine hoof onto which the horseshoe 10 is to be affixed. In generally, the function of the clips 100 is to provide an abutting engagement between the outer retaining clips 100 and the outer surface of the equine hoof, as shown in FIGS. 9 and 10, such that the position of the horseshoe 10 adjacent the underside surface of the equine hoof is stabilized against at least backwards sliding movement and/or rotating/pivoting movement when a nail is driven through a nail hole in the horseshoe 10 and into the equine hoof. The inclination of the outer retaining clip 110 may be adjusted by bending to conform to the inclination of the outer hoof surface as required.

Figure 13:
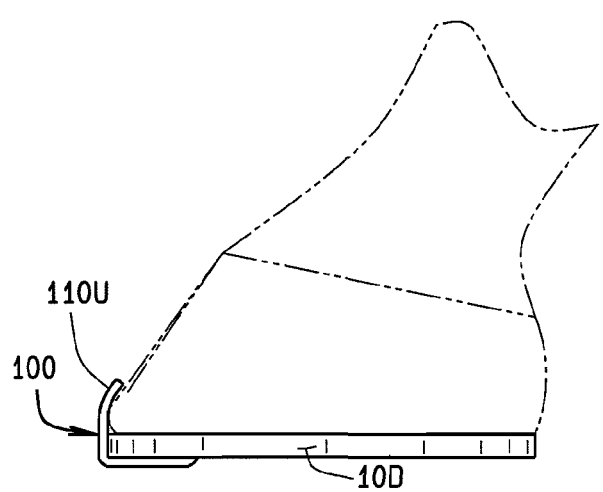
FIG. 13 is a side view of an equine hoof during attachment of the horseshoe shown in FIG. 11.
Figure 14:
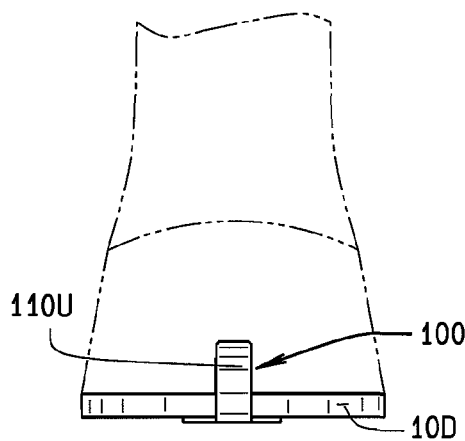
FIG. 14 is a front view of an equine hoof during attachment of the horseshoe shown in FIG. 11.
Figure 15:
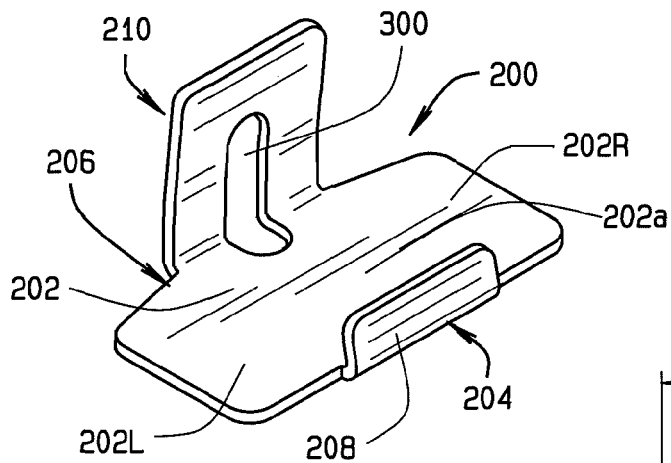
FIG. 15 is a perspective view similar to FIG. 3, illustrating an alternate embodiment of the removable horseshoe clip of the present disclosure.
Figure 16:
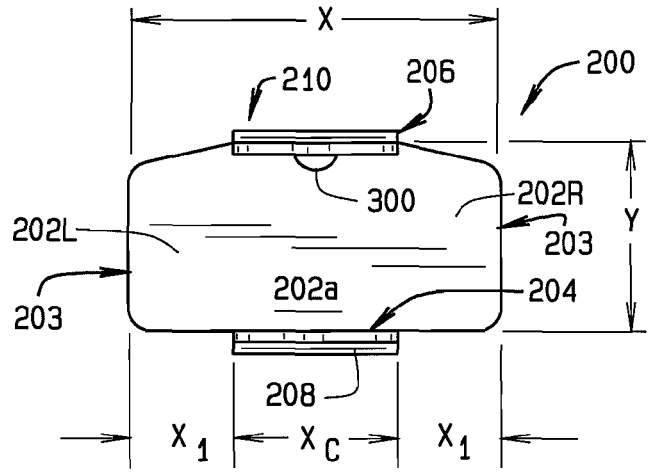
FIG. 16 is a top plan view of the clip of FIG. 15.

In an alternate use, as shown in FIGS. 11-14, a single clip 100 is fitted to the bottom surface 10B a horseshoe 10 generally on a longitudinal midline of the horseshoe 10 at the toe. In generally, the function of the single clip 100 is to provide an abutting engagement between the outer retaining clip 100 and the outer surface of the equine hoof, as shown in FIGS. 13 and 14, such that the position of the horseshoe 10 adjacent the underside surface of the equine hoof is stabilized against backwards sliding movement when a nail is driven through a nail hole in the horseshoe 10 and into the equine hoof. The inclination of the upper portion of the outer retaining clip 110 may be adjusted by bending to conform generally to the inclination of the outer hoof surface as required.

After the horseshoe 10 is affixed to the equine hoof by a sufficient number of other attachment means, the clips 100 are removed. To remove the clips 100, the outer retaining clip 110 may be levered down the outer surface of the equine hoof, releasing the planar base 102 parallel alignment with the horseshoe bottom surface 10B and "popping" the clip 100 free from engagement with the horseshoe 10 by pivoting about the inner retaining clip engagement with the inner peripheral surface of the horseshoe.

As required, the inner retaining clip 108 and the outer retaining clip 110 may be re-bent or inclined in the inward direction to maintain a desired amount of clamping force or pressure when affixed to a horseshoe 10, as repeated usage will likely result in an outward bending of the retaining clips 108, 110 and a reduced clamping force or pressure.

Those of ordinary skill in the art will recognize that horseshoes 10 are produced in a variety of sizes, having different thicknesses and widths depending upon the particular use for the horseshoe 10 is intended. Accordingly, it will be understood that the horseshoe clips 100 of the present disclosure may be manufactured in a wide range of dimensions which will be varied according to the particular size of horseshoe 10 for which the clip 10 is intended to be used. For example, the front-to-back width of the planar base portion 102 may be varied to accommodate horseshoes 10 having a narrow width, as well as horseshoes 10 have a wide width. Similarly, the overall height of the inner retaining clip 108 and outer retaining clip 110 may be varied to accommodate horseshoes 10 having a small vertical thickness as well as horseshoes 10 having a large vertical thickness. Such variations in dimensions as required for use with different horseshoes 10 are considered to be within the scope of this disclosure.

Similarly, the specific size, shape, and number of the inner and outer retaining clips 108, 110 may be varied without departing from the scope of the invention. For example, the single outer retaining clip 110 shown in middle of the outer peripheral edge 106 of FIG. 3 may be replaced by a pair of outer retaining clips spaced apart across the length of the outer peripheral edge 106 of the central portion 102a, such that a single clip 100 may be used to provide abutting contact to a plurality of points on the outer surface of an equine hoof during use. Alternatively, either the inner or outer retaining clips 108, 110 may have a width which corresponds to the entire length of either the inner or outer peripheral edges 104, 106 of the planar base 102.

Those of ordinary skill will further recognize that the specific materials from which the clip 100 is manufactured may be varied according to need, but that the material must be sufficiently resilient and spring-like to exert the required clamping forces on the horseshoe inner and outer peripheral edges upon deflection of at least one of the inner or outer retaining clips from a rest configuration upon engagement with the horseshoe. Since it is intended that the clip 100 be reusable, and that the retaining clips retain a degree of resilience upon bending to return to their original configuration, a metal such as spring-steel is a preferred material, but those of ordinary skill will recognize that other suitable materials or combination of materials may be utilized, such as plastics, polymers, or combinations of metals and plastics.

Turning next to FIGS. 15-20, an alternate configuration of the removable horseshoe clip is shown generally at 200. The removable horseshoe clip 200 is adapted for temporary placement on the horseshoe 10 during fitment and attachment of the horseshoe to an equine hoof. The horseshoe clip 200 consists of a planar base portion 202 including a central portion 202*a* with a front-to-back dimension identified at "Y" in FIG. 16, having an inner peripheral edge 204 adapted to align with an edge of the inner peripheral surface 10C of the horseshoe 10, and an outer peripheral edge 206 adapted to align with an edge of the outer peripheral surface 10D of the horseshoe 10. A pair of mirror-image rigid lateral bracing segments 202R and 202L are continuous with, and extended laterally outward from, opposite lateral sides of said central portion a short distance, designated as "X1" in FIG. 16. Generally, the front-to-back dimension "Y" of the central portion 202*a* is selected to correspond to the width of the horseshoe 10 for which the clip 200 is sized to fit.

Figure 17:
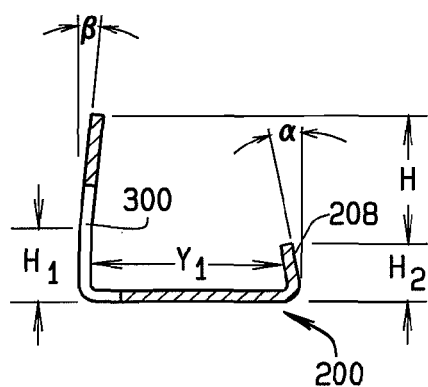
FIG. 17 is a front-to-back cross-sectional view of the clip of FIG. 15.

At least one inner retaining clip segment 208 is disposed adjacent to the inner peripheral edge 204, and extends generally upward from the central portion 202*a*. The inner retaining clip segment 208 has a height "H2", which is selected to correspond approximately to, or slightly smaller than, the thickness of the horseshoe 10 for which the clip 200 is sized to fit, and, at a rest configuration, is inclined inward towards the center portion 202*a* at a slight angle $\alpha$, as best seen in FIG. 17. The transverse side-to-side width of the inner retaining clip segment 208 corresponds generally to the transverse side-to-side width of the central portion 202*a*, and is designated "Xc" in FIG. 16.

At least one outer retaining clip segment 210 extends upward from the central portion 202*a*, adjacent to the outer peripheral edge 206. The outer retaining clip 210 consists of a lower portion 210L and an upper portion 210U. The lower portion 210L has a height "H1", which is selected to correspond approximately to, or slightly greater than, the thickness of the horseshoe 10 for which the clip 200 is sized to fit, and at a rest configuration is aligned perpendicular to the central portion 202*a*. The upper portion 210U extends upward from the lower portion 210L, to a height "H" above the height of the horseshoe 10, and is inclined inward towards the center portion 202*a* at a slight angle $\beta$, as best seen in FIG. 17, corresponding generally to the inclination of a hoof to which the horseshoe 10 is to be affixed. Preferably, the planar base 202, the inner retaining clip 208, and the outer retaining clip segment 210 are of a unitary construction, such as formed from a resilient stamped metal sheet or spring steel which will return to the original rest configurations upon non-deforming deflection there from.

Figure 18:
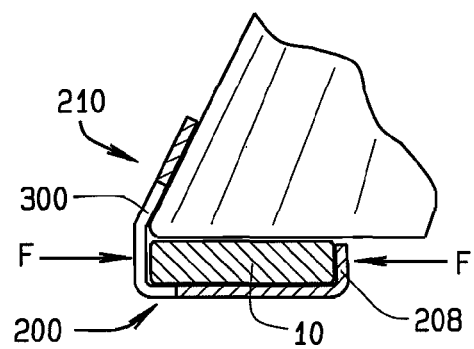
FIG. 18 is a front-to-back sectional view, similar to FIG. 17, illustrating the engagement of the clip with a horseshoe and the abutment to a hoof.

During use, a horseshoe clip 200 is temporarily fitted to the horseshoe 10 in a "snap" or "clamp" style engagement at the desired position. As is best seen in FIGS. 18 and 19, the inward inclination of the inner retaining clip segment 208 and the vertical orientation of the outer retaining clip lower portion 210L define a decreasing spacing "Y1" there between, such that at least one of the retaining clip segments 208, 210 is resiliently displaced or deflected outward during engagement with the inner and outer peripheral edges 10C and 10D of a horseshoe 10. The resilient nature of the material forming the inner and outer retaining clip segments 208, 210, together with the deflection of at least one of the retaining clip segments results in the application of a clamping or gripping force on the horseshoe inner and outer peripheral surfaces, between the inner and outer retaining clip segments 208, 210, which retains the horseshoe clip 200 in engagement with the horseshoe 10. The central portion 202*a* of the planar base is not required to engage or abut the lower surface of the horseshoe 10, but should be disposed parallel thereto upon proper engagement between the horseshoe 10 and the inner and outer retaining clip segments.

Figure 19A:
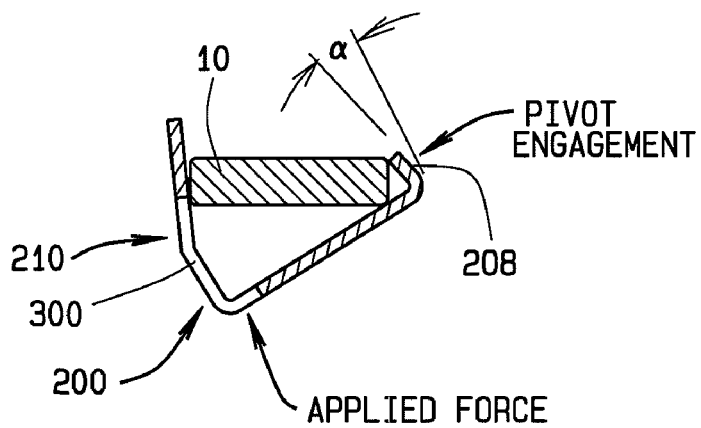
FIG. 19A is a sectional view which illustrates initial engagement of the removable clip with a horseshoe at the inner peripheral surface.
Figure 19B:
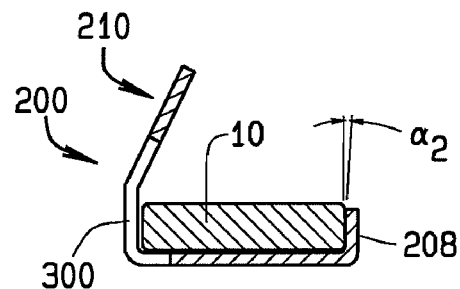
FIG. 19B is a sectional view which illustrates the completed engagement of the removable clip with the horseshoe resulting from application of the force indicated in FIG. 19A.
Figure 20:
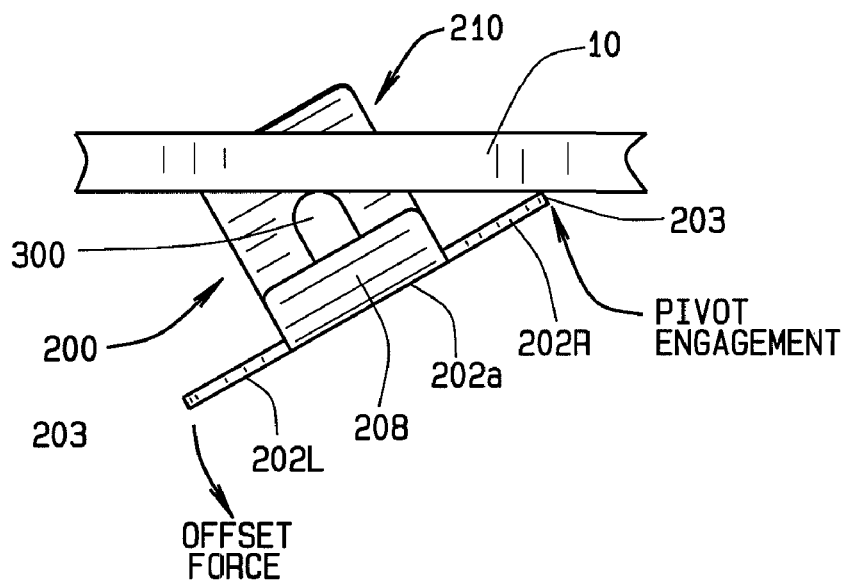
FIG. 20 illustrates the function of the lateral bracing segments to displace a pivot point transversely outward from the center portion and clip segments during application of an offset or prying force to remove the clip from the horseshoe.

A method for engaging the horseshoe clip 200 with the horseshoe 10 is illustrated in FIGS. 19A and 19B. Initially, the inner retaining clip segment 208, with the inwardly inclined rest configuration is positioned in angled contact with the inner peripheral surface 10C of the horseshoe 10, such that the planar base 202 is inclined relative to the bottom surface 10B of the horseshoe. The upper portion 210U of the outer retaining clip segment 210 is disposed adjacent the outer peripheral surface 10D of the horseshoe. In this position, the inner and outer retaining clip segments 208 and 210 remain in their rest configurations, and there is no clamping engagement between the horseshoe 10 and removable clip 200.

Once the clip 200 is initially positioned, an application of an applied force "F" such as shown in FIG. 19A at the base portion 202, pivots the removable clip 202 generally about the engagement of the inner retaining clip segment 208 and the inner peripheral edge of the horseshoe 10, forcing the base portion 202 into parallel alignment with the horseshoe bottom surface 10B, and deflecting the inner retaining clip segment 208 from the rest configuration by decreasing the inward inclination angle $\alpha$ to the smaller deflection shown as $\alpha$2 in FIG. 19B. As the inner retaining clip segment 208 deflects, the outer retaining clip segment 210 may deflect as it moves upward along the outer peripheral edge of the horseshoe 10, until the lower portion 210L engaged therewith.

With the inner retaining clip segment 208 deflected from the rest configuration, a tension force seeking to return the inner retaining clip to the rest configuration is generated, and acts to drive the inner retaining clip segment 208 towards the inner peripheral surface of the horseshoe 10, effectively clamping the horseshoe 10 between the inner retaining clip segment 208 and the lower portion 210L of the outer retaining clip segment 210. The tension force is sufficiently strong enough to retain the removable horseshoe clip 200 in place on the horseshoe 10 during the shoeing process.

During the shoeing process it is possible for offsetting forces to be exerted against the removable horseshoe clip 200. The lateral bracing segments 202L and 202R which extend laterally from the central portion 202*a* of the planar base act to resist these offsetting forces by displacing the location of any pivoting contact between the removable horseshoe clip 200 and the bottom surface 10B of the horseshoe 10 laterally outward from the location of the retaining clips to the lateral edges 203 of the lateral bracing segments 202L and 202R. By moving the location of pivoting contact laterally outward, the amount of force required to displace the horseshoe clip 200 from the horseshoe 10, if applied in an offset manner, such as at one of the lateral edges 203, is greatly increased.

Preferably, the lateral width X1 of each of the lateral bracing segments is selected to provide increased lateral stability and resistance to removal by offsetting lateral forces for the removable horseshoe clip 200 against the bottom surface 10B of the horseshoe 10.

Removal of the horseshoe clip 200 from engagement with the horseshoe 10 is substantially the reverse of the installation process. The outer retaining clip segment 210 is driven vertically downward, displacing the horseshoe outer peripheral edge from engagement with the lower portion 210L, and pivoting the clip 200 about a pivoting engagement between the inner retaining clip 208 and the inner peripheral surface 10C of the horseshoe. As the horseshoe outer peripheral edge disengages from the lower portion 210L of the outer retaining clip segment 210, the inner retaining clip segment 208 is freed to return to the inward inclination of the rest condition, and the retaining force engaging the horseshoe 10 is released.

Depending upon the particular material selected for construction of the removable horseshoe clip 10, the tension forces generated by the deflection of the inner retaining clip 208 from the rest condition during engagement with the horseshoe 10 may be quite strong. If the tension forces are too great, removal of the horseshoe clip 200 may be difficult or dangerous, as the natural tendency of the deflected inner retaining clip segment to return to the rest configuration may occur suddenly upon release, causing the removable horseshoe clip 200 to spring quickly away from the horseshoe 10. In order to regulate the amount of tension force holding the removable horseshoe clip 200 to the horseshoe 10, one or more tension relief slots or openings 300 may be formed in either the inner or outer retaining clip segments by removing material there from. For example, as shown best in FIG. 15, a tension relief slot or opening 300 formed at the midline of the outer retaining clip segment 210 extends from the lower portion 210L and partially into the central portion 202a of the planar base and the upper portion 210U. The tension relief slot or opening 300 structurally weakens the coupling between the planar base and the outer retaining clip segment 210, permitting a degree of deflection in the lower portion 210L during engagement and disengagement of the removable clip 200 from the horseshoe 10. By selecting the amount of material to be removed in the tension relief slot or opening 300, the amount of deflection is regulated, and accordingly, the maximum tension force which can be exerted between the inner retaining clip segment and the outer retaining clip segment during engagement with the horseshoe 10 is limited. It will be recognized that the size, placement, and number of tension relief slots or opening 300 may be varied as required to achieve the desired moderation of the tension forces securing the removable horseshoe clip 200 to the horseshoe 10. Optionally, by extending the tension relief slot or opening vertically upward onto the upper portion 210U, the flexibility of the upper portion 210U may be altered to facilitate bending of the upper portion 210U to conform the outer surface of a hoof.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A removable horseshoe clip adapted for temporary placement on a horseshoe having a top surface, a bottom surface, an inner peripheral surface, and an outer peripheral surface, during fitment and attachment of the horseshoe to an equine hoof, comprising:
   a planar base including a central portion having an inner peripheral edge adapted to align with an inner peripheral edge of the horseshoe, and an outer peripheral edge adapted to align with an outer peripheral edge of the horseshoe, and a pair of rigid lateral bracing segments perpendicular to the inner and outer peripheral edges of the central portion, each extended laterally from opposite sides of said central portion;
   at least one inner retaining clip segment having a rest configuration which extends generally vertically upward from said inner peripheral edge with an inward inclination towards said central portion, having a height which does not exceed to the vertical thickness of the horseshoe;
   at least one outer retaining clip segment having a rest configuration extending vertically upward from said outer peripheral edge, said outer retaining clip having a lower portion perpendicular to said base and having a height which is substantially equal to the vertical thickness of the horseshoe, and an upper portion extending vertically from inclined inwardly from said lower portion towards said central portion, said upper portion adapted for abutting engagement with a outer surface of an equine hoof during a fitment and attachment procedure to facilitate maintaining said horseshoe position during said fitment and attachment procedure; and
   wherein at least one of said inner and outer retaining clip segments resiliently deflect from said rest configurations under tension during temporary placement on said horseshoe, exerting a retaining clamping force on said inner and outer peripheral surfaces of said horseshoe to retain said removable horseshoe clip there on without the use of an additional fastener, and wherein each of said inner and outer retaining clips resiliently revert to said associated rest configurations upon removal from said horseshoe and release of said tension.

2. The removable horseshoe clip of claim 1 wherein said inner retaining clip segment, said planar base, and said outer retaining clip segment are integrally formed.

3. The removable horseshoe clip of claim 1 wherein said inner retaining clip, said planar base, and said outer retaining clip are formed from a resilient material and are biased to return to said rest configuration upon non-deforming deflection.

4. The removable horseshoe clip of claim 1 wherein each of said lateral bracing segments has a lateral width dimension between an outer lateral edge and said central portion which is at least equal to a vertical height of said inner retaining clip segment; and
   wherein said central portion has a lateral width dimension corresponding to the lateral width dimension of the wider of the inner and outer retaining clip segments.

5. The removable horseshoe clip of claim 4 wherein each of said lateral bracing segments is configured to displace a pivot point for applied offset forces laterally outward from said central portion to resist removal of said horseshoe clip from said horseshoe.

6. The removable horseshoe clip of claim 4 wherein each of said lateral bracing segments has a lateral width dimension selected to control removal of said horseshoe clip from said horseshoe.

7. The removable horseshoe clip of claim 1 wherein said inner retaining clip segment and said outer retaining clip segment have equal lateral widths.

8. The removable horseshoe clip of claim 1 further including a second outer retaining clip segment having a rest configuration extending vertically upward from said outer peripheral edge, said outer retaining clip having a lower portion perpendicular to said base with a height which does not exceed the vertical thickness of the horseshoe, and an upper portion inclined inwardly from said lower portion towards said central portion, said upper portion adapted for abutting engagement with a outer surface of an equine hoof during a fitment and attachment procedure to facilitate maintaining said horseshoe position during said fitment and attachment procedure; and
   wherein said at least one outer retaining clip segment and said second outer retaining clip segment are spaced apart from each other along said outer peripheral edge of said planar base.

9. The removable horseshoe clip of claim 1 further including a second inner retaining clip segment extending vertically from said inner peripheral edge of the base, said second inner retaining clip having an inward inclination towards said planar base center portion and configured to engage an inner peripheral surface of the horseshoe; and wherein said at least one inner retaining clip segment and said second inner retaining clip segment are spaced apart from each other along said inner peripheral edge of said base.

10. The removable horseshoe clip of claim 1 further including at least one tension relief slot or opening in at least one retaining clip segment, said at least one tension relief slot or opening having dimensions selected to alter resilient tension forces action on said retaining clip segment in response to deflections associated with engagement of said horseshoe by said removable horseshoe clip.

11. The removable horseshoe clip of claim 10 wherein said at least on tension relief slot or opening is disposed at least partially in said lower portion of said outer retaining clip segment and at extends at least partially into said central portion of said base.

12. The removable horseshoe clip of claim 10 wherein said at least on tension relief slot or opening extends at least partially into said central portion of said base from said inner retaining clip segment.

13. A method for maintaining placement of a horseshoe against an equine hoof surface during attachment thereto using a removable horseshoe clip having a planar base portion, an inwardly inclined inner retaining clip segment, and an outer retaining clip segment, following sizing and placement determination for the horseshoe, comprising:

engaging the inner peripheral surface of the horseshoe with the inwardly inclined inner retaining clip segment of the removable horseshoe clip, said planar base portion extends towards the outer peripheral edge of the horseshoe and the outer retaining clip segment is in proximity to the outer peripheral edge;

pivoting the removable horseshoe clip towards the horseshoe, generally along the engagement between the inwardly inclined inner peripheral surface and the inner retaining clip segment, such that said planar base portion is positioned substantially parallel to a base surface of the horseshoe, and the outer retaining clip segment engages said outer peripheral surface of the horseshoe;

wherein said engagement of said inner retaining clip segment and said outer retaining clip segment with said respective inner and outer peripheral surfaces of said horseshoe resiliently deflects at least one of said clip segments from a rest configuration, said resilient deflection exerting a clamping force between said inner and outer retaining clips which positively engages said removable horseshoe clip with said inner and outer peripheral surfaces without the use of an additional fastener;

positioning said horseshoe against the equine hoof surface;

abutting a portion of said outer retaining clip against an outer surface of said equine hoof, whereby said abutting portion resists at least sliding movement of said horseshoe relative to said equine hoof;

affixing said horseshoe to the equine hoof; and releasing said at least one removable horseshoe clip from said positive engagement with said affixed horseshoe and from said abutment with said equine hoof outer surface by application of an offset force to pivot at least one of said inner or outer retaining clip segments from engagement with said associated horseshoe peripheral surface, releasing said clamping force and resiliently returning said clip segments to said rest configuration for subsequent reuse.

14. The method of claim 13 wherein said horseshoe is a clip-less horseshoe, and wherein said at least one removable horseshoe clip is engaged with said horseshoe in a position whereby said hoof abutting portion of said outer retaining clip resists at least backward sliding movement of said horseshoe relative to said equine hoof during affixation.

15. The method of claim 13 wherein said horseshoe includes at least one permanent clip for engagement with said equine hoof, and wherein said at least one removable horseshoe clip is engaged with said horseshoe in a position whereby said hoof abutting portion of said outer retaining clip segment resists at least lateral movement of a heel portion of said horseshoe relative to said equine hoof during affixation.

* * * * *